United States Patent [19]

Graden

[11] 4,429,386
[45] Jan. 31, 1984

[54] BUFFER ARRANGEMENT OF A PCM EXCHANGE SYSTEM

[75] Inventor: Maynard Graden, Reston, Va.

[73] Assignee: Siemens Corporation, Iselin, N.J.

[21] Appl. No.: 222,700

[22] Filed: Jan. 5, 1981

[51] Int. Cl.³ .............................................. H04J 3/06
[52] U.S. Cl. .................................. 370/100; 370/108;
                                        370/103; 375/118
[58] Field of Search ............... 370/100, 103, 105, 108;
                                    375/106, 107, 108, 118

[56] References Cited

U.S. PATENT DOCUMENTS

| | | | |
|---|---|---|---|
| 4,095,048 | 6/1978 | Athénes et al. | 370/103 |
| 4,359,770 | 11/1982 | Suzuka | 370/100 |
| 4,368,531 | 1/1983 | Chopping | 375/118 |
| 4,371,962 | 2/1983 | Zeitraeg | 370/100 |

FOREIGN PATENT DOCUMENTS

2641488  3/1978  Fed. Rep. of Germany .

*Primary Examiner*—Gerald L. Brigance
*Attorney, Agent, or Firm*—Karl F. Milde, Jr.; Andrew G. Rodau

[57] ABSTRACT

A pulse code multiplex exchange system includes a buffer arrangement for compensating both short and long term phase drift of information between plesiochronous data paths each being controlled for block information transfer by a separate clock. An alignment buffer is arranged between the two data paths. It has two sections, each having a capacity for storing alternately one of two subsequent information blocks, and on chip address decoders for selecting write and read addresses. Separate address generators are associated with the buffer for generating consecutive write addresses under control of a first clock and read addresses under control of a second clock, respectively. A guard distance detector continuously monitors the distance between the present write address and the respective read address, and initiates a slip operation for switching subsequent read operations from one section of the alignment buffer to the other section, if the address distance falls short of a minimal guard distance.

4 Claims, 4 Drawing Figures

BUFFER ARRANGEMENT OF A PCM EXCHANGE SYSTEM

BACKGROUND OF THE INVENTION

The invention relates to a buffer arrangement of a pulse code time multiplex (PCM) exchange system for compensating both short and long term phase drift of information between a first and a second data path. The first data path may be a PCM time multiplex transmission line for transmitting information to a receiving unit of a PCM time multiplex exchange system, wherein such data transmission is controlled by a first (external) clock. The second data path may be an internal data path connected to the receiving unit of the exchange system. This unit and the second data path are controlled by a second (internal) clock. In theory, the two different clock pulse trains have to be exactly synchronized to achieve a synchronous mode of operation. In practice, such characteristics cannot be obtained with reasonable effort, and a plesiochronous mode of operation has to be taken into consideration. In this mode of operation, a phase drift and even a frequency drift between both clocks have to be acknowledged. If even the frequencies of both clocks do not differ from each other, the phase relationship between individual incoming PCM signals and corresponding conditions of the exchange system unit change steadily.

As well known, the influence of such phase drift can be eliminated to some extent by buffering information at an interface between both data paths. Incoming PCM signals are stored in a buffer storage at the rate of the external clock and are read out to the second data path at the rate of the internal clock. Transmitted information thus is aligned to the time pattern of the exchange system unit.

Because of the limited storage capacity of any such buffer storage, at least in case of a long term frequency shift between the external and the internal clock, after some time a phase correction has to be performed resulting in a loss of information which has to be tolerated. This is true for frequency differences in both directions. A higher frequency of the external clock leads to storing of more pieces of information than are read out during one and the same time span. The difference in position between pieces of information being currently buffered and those which are read out decreases correspondingly. As soon as a writing operation into the storage buffer is about to intersect a reading operation from the same storage location, transmitted information has to be skipped to avoid such colliding buffer operations.

If the frequency difference between the external clock and the internal clock constantly has a negative value, i.e. reading is performed faster than writing, the offset in position increases to an extent which finally also may cause an interception. An address jump for reading operations is performed which results in reading buffered pieces of information a second time, thereby re-establishing the theoretical optimum of the phase shift. In both cases, a loss of information occurs, either by surpassing information or by transmitting pieces of information a second time.

According to the basic theory of pulse code modulation (PCM) such information loss is not of serious concern as long as the sampling frequency is high enough compared to the maximum frequency of the original analog signal. With sophisticated PCM time multiplex exchange systems, however, a loss of pieces of information becomes more serious. Presently known PCM exchange systems, for example, make use of a method of grouping channels which is known as justification or stuffing method. According to this method, a train of coded pulses is transmitted in the form of PCM words wherein specific bit positions are reserved for synchronizing purposes, rather than being used for carrying analog signal information. These synchronizing bits are often also designated as stuffing or justifying digits, and are split off at a receiving station for reproducing the original time pattern. Especially in wide spread telecommunication systems several transmission lines may be linked together for transmitting information and the phase drifts of the individual lines accumulate to an extent which is critical, if such self-synchronizing methods are used.

Therefore, corrections of phase drift in a buffer storage have to be executed such that they do not interfere with a specific order of PCM words in a frame containing time and/or space multiplexed PCM words of a group of analog channels. This is of importance especially if wide band information is transmitted within one pulse frame and an undetermined number of time channels could be lost by a slip operation. The alignment of channels to each other within one pulse frame would be disturbed and could not be reproduced without unreasonable effort.

In German Pat. No. 2,641,488 there is disclosed a conventional solution for this object by means of a circuit arrangement for compensating phase drift of information transfers. There is provided a buffer arrangement consisting of an intermediate storage device and a buffer storage. The intermediate storage device has a storage capacity which is supposed to be sufficient for compensating even a maximum of phase jitter of the first clock. The intermediate storage device buffers eight PCM words and respective parts of time channel addresses for identifying the stored PCM words within a PCM frame. In any case when subsequent neighboring storage locations of the intermediate storage device are selected for a reading and a writing operation a special mode of operation at a higher frequency is initiated.

If the frequency of the first clock is higher than the frequency of the second clock, the intermediate storage device is read out twice as fast as normal. In case of a higher second clock frequency the same storage location of the intermediate storage device is read out several times.

If a series of special mode operations has to be performed because of a long term discrepancy of the clock frequencies, the buffer storage designed for buffering PCM words of an entire pulse frame will not be able to catch up or to balance these accumulating corrections. In such a case, also, a correction operation at the buffer storage is performed to avoid interfering of read and write operations at the same buffer location. According to the characteristic of the known circuit arrangement, any correction is to be accomplished at the time when the first PCM word of a pulse frame is read out, thus avoiding a complicated re-assignment or re-alignment of time channels within a pulse frame. This is achieved by controlling the operation of the intermediate storage device such that the starting time of a correction operation as described herein before coincides with a time slot of the time pattern of a pulse frame assigned to a specific time channel. This starting time determines the series of correction operations to be completed at a moment suitable for performing a subsequent correction operation at the buffer storage, if necessary.

The operation of the known buffer arrangement thus depends upon a variety of inference factors requiring a complicated monitoring and controlling system and still has some restrictions with respect to the amount of frequency drift which is manageable by the exchange system.

It is, therefore, a general object of the present invention to provide an improved pulse code time and/or space multiplex exchange system having a higher phase drift tolerance characteristic.

Another object of the present invention is to provide a buffer arrangement in such an exchange system for aligning the transmission of PCM signals from a first data path to a second data path independent from monitoring the starting point or the occurrence of specific channels of a pulse frame.

Still another object of the present invention is to provide a buffer arrangement as set forth herein before, with less complicated control logic than with conventional buffer arrangements.

These objects and other and further objects will become more apparent to those skilled in the art from the following description with reference to the drawings.

SUMMARY OF THE INVENTION

In a pulse code multiplex exchange system a buffer arrangement is provided for compensating both short and long term phase drift of information between a transmitting and a receiving data path, which are plesiochronously controlled for block information transfer by a first clock and a second clock, respectively. The buffer arrangement includes according to the present invention an alignment buffer arranged between the transmitting and the receiving data path and composed of two sections. Each section has a capacity for storing alternately one of two subsequent information blocks in continuous storage locations. There are provided buffer addressing means associated with the alignment buffer for selecting write addresses and read addresses. Address generating means are connected to the buffer addressing means for generating consecutive write addresses for the alignment buffer controlled by the first clock and for generating read addresses accordingly under control of the second clock. Furthermore there are arranged means for continuously monitoring the offset between the current read address and the respective write address for detecting a minimum guard distance and for initiating a slip operation by complementing the most significant bit of subsequent read addresses. Such slip operation is initiated whenever the address offset falls short of the predetermined minimum guard distance.

In such a buffer arrangement just one type of storage device is provided for intermediately storing pieces of information which are received from the transmitting data path. However, the main characteristic of the buffer arrangement is not only the capacity of this buffer but its operation by means of separately controlled address generators and the minimum guard distance detector. A slip operation in the buffer arrangement according to the present invention can be performed whenever it becomes necessary without restriction with respect to a starting position of a block of information or any other comparable limitations.

Therefore, complicated look-ahead techniques offering positive or negative values of a phase drift and the like are no longer necessary. Maintaining proper alignment simply is reduced to continuing reading from the corresponding storage location of the other section of the buffer memory.

BRIEF DESCRIPTION OF THE DRAWINGS

A better understanding of the invention may be had by reference to the following description of a preferred embodiment in conjunction with the accompanying drawings in which.

DETAILED DESCRIPTION OF THE PREFERRED EMBODIMENT

In a pulse code time modulated telecommunication system data is transferred across a transmission line to a receiving branch of a data exchange unit. It is understood that the data transmitted along this line to be designated as external data path is synchronized by an external clock whereas receiving of data at the interface of the exchange unit and processing of received data is performed under control of an independent internal clock. The internal data paths in the exchange unit have a fixed repetition rate and have defined starting points. These are parameters that cannot be arbitrarily varied. These internal data paths must be matched to the external data path by some predefined algorithm. A set of consecutive time slots in which the position of each time slot can be identified by reference to a synchronizing signal is conventionally called a frame. Based on this definition, both the external data path and the internal data path can be specified further in having nominally equivalent frame repetition rates.

It is now assumed that the system including the external data path and the internal data path is characterized in representing a plesiochronous mode of operation. Two signals may be called plesiochronous if their corresponding significant instants occur at nominally the same rate, and any variation in rate is constrained within specified limits. The plesiochronous mode of operation takes into account jitter and drift. Jitter refers to short term variations of the significant instants of digital signals from their ideal positions of a pulse train. The term "drift" applies to any change in the position of predetermined reference points in different digital data paths which have nominally equivalent rates. Influenced by the cumulative effects of jitter caused by a variety of devices in a data transmission system the exact moment when a specific time slot on the external data path will appear cannot be predicted. This becomes visible as variance in lengths of consecutive time slots on the external data path. Positive or negative drift stems from a longer term positive or negative difference between the frame repetition rates of the external data path and the internal data path. Measures have to be taken to guard against those particular misalignments of the internal and the external data paths that would endanger time slots integrety.

Figure 1:
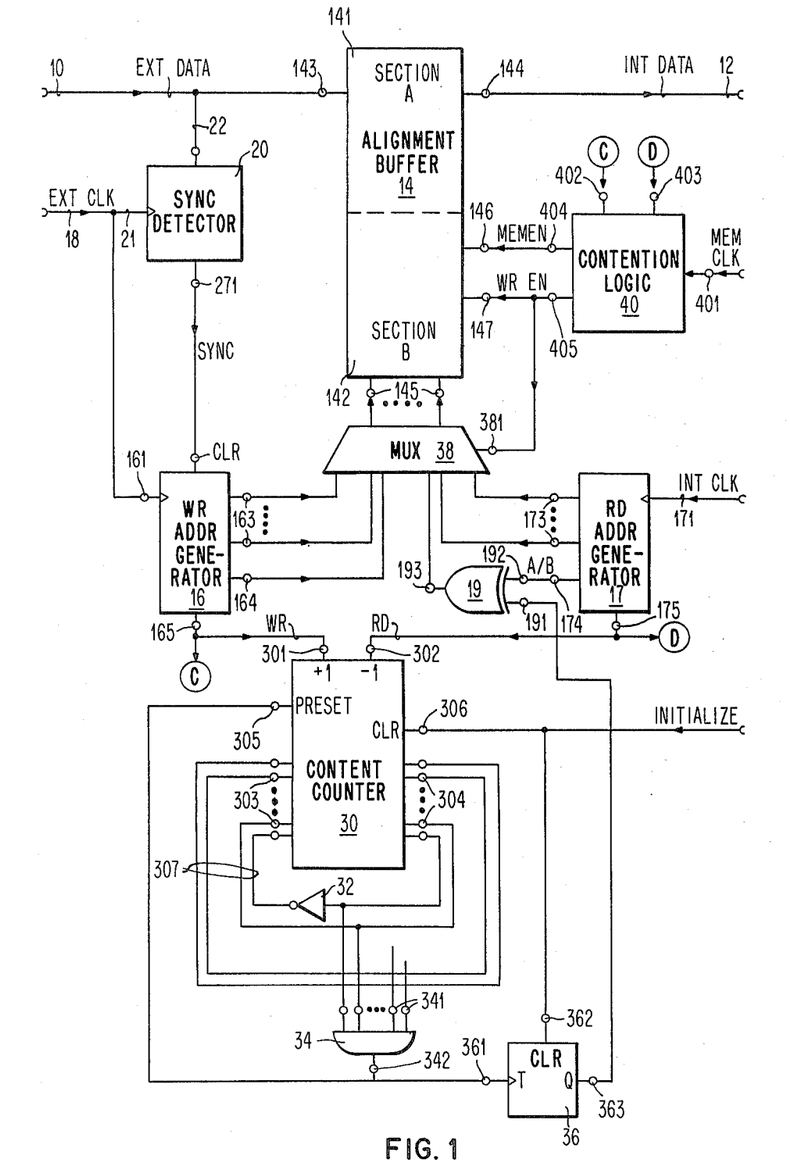
FIG. 1 shows a general block diagram of a buffer arrangement according to the present invention including an alignment buffer for intermediately storing consecutive blocks of information and devices for controlling the operation of this buffer.

FIG. 1 represents in form of a schematic block diagram an alignment buffer arrangement provided for frame matching of data carried along an external data path 10 and an internal data path 12. The matching of frames is accomplished by means of an alignment buffer 14 including two sections 141 and 142. These buffer sections each have a capacity for storing an entire pulse frame. According to the different transmission formats of conventional PCM telecommunication systems, the actual storage capacity of the alignment buffer 14 may vary dependent upon such format. In any case, the alignment buffer can be composed of arrays of conventional memory components such as 256-bit bipolar Random Access Memories (RAM) which are commercially available. Component 82S16 of Signetics could be used for a bit-oriented buffer arrangement or component 82S09 of the same manufacturer would be applicable for a byte-oriented buffer organization. In both cases, the components have on-chip address decoding and can be easily assembled for implementing larger arrays in a conventional manner.

The storage components have built-in buffered data inputs and data outputs—as schematically represented in FIG. 1 by reference symbols 143 and 144—which are connected to the external data path 10 and the internal data path 12, respectively. There are provided address inputs 145 and two inputs 146 and 147 for control signals. Data which is transferred across the external data path 10 at one repetition rate is stored in the alignment buffer 14 and is read out to be carried along the internal data path 12 at a different time. As will be explained later in detail, frame matching is obtained by storing alternately the digital signals of an entire pulse frame in consecutive storage locations of either the first memory section 141 or the second section 142. Reading operations with respect to the sequence of storing operations have a variable offset depending upon the current misalignment of data transferred across the data paths 10 and 12. Write operations are achieved by means of a write address generator 16 implemented by a digital synchronous counter. The count state is increased by one by an external clock which is supplied to the arrangement across a first clock signal line 18. The address generator 16 can be assembled from any one of the conventional synchronous counter elements such as from components of the Texas Instruments Series SN54161 which are synchronous 4-bit counters with direct clear. These counters are specially designed for easy cascading to achieve any desired combination of maximum counts.

These characteristics of commercially available counter components are illustrated in FIG. 1 by a clock input 161, a clear input CLR, parallel first data outputs 163 and a second data output 164. As indicated, the single second data output 164 carries the most significant address digit (A or B) determined by the current state of the highest level counter stage. This address digit determines corresponding storage locations in either one of the A and B sections 141, 142 of the alignment buffer 14. The clock input 161 is connected to the external clock signal line 18 and the clear input CLR is supplied by output signals of a synchronizing detector 20 to be described, yet.

The synchronizing detector 20 provides synchronization of data transferred along the external data path and buffering the same at predetermined storage locations either in the first section 141 or the second section 142 of the alignment buffer 14. It is understood that embedded into the pulse train a synchronizing bit is transferred in a cyclic sequence which occurs at a well-defined position. The occurrence of the synchronizing bit is evaluated for detecting the frame position within the pulse train transferred across the external data path 10.

Figure 2:
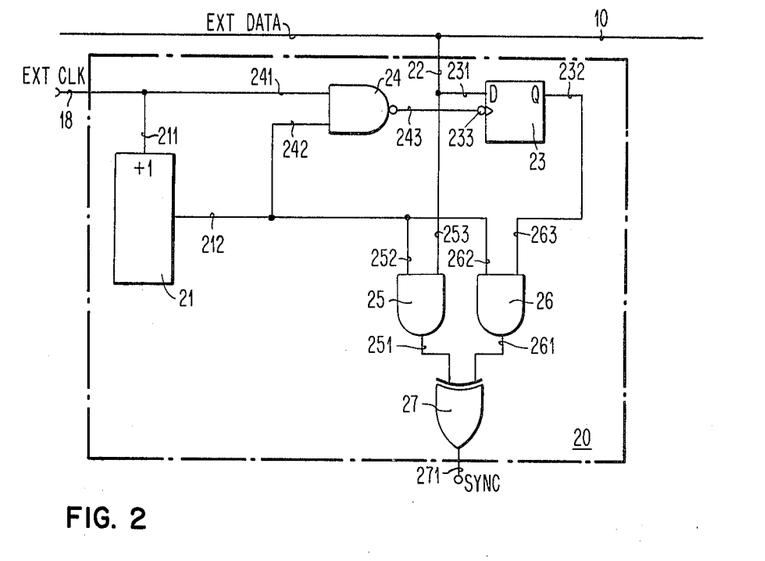
FIG. 2 represents a detailed block diagram of one of these control devices, a synchronizing detector for obtaining the current position of a block of information.

The synchronizing detector 20—as shown in a detailed block diagram in FIG. 2—includes a modulo N counter 21, wherein N designates the number of bits which are transferred between two consecutive synchronizing bits. This counter receives clock pulses at a count input 211 connected to the external clock signal line 18, and generates a signal at a signal output 212, if the maximum count is reached.

Furthermore, the synchronizing detector 20 is connected by a data input line 22 to the external data path 10. Adjacent to this data input line there is provided a D-flip-flop 23 having a signal input 231 connected to data input line 22, a signal output 232 and clock input 233. The synchronizing detector 20 includes a first AND-gate 24 having a first and a second input 241 and 242, respectively and an output 243. The first input 241 is connected to the external clock signal line 18 and the second input 242 is linked to the signal output 212 of the modulo N counter 21. The output 243 of the AND-gate 24 provides a clock signal which is supplied to the clock input 233 of the D-flip-flop 23.

Another main characteristic of the synchronizing detector 20 is a comparison network composed of two further AND-gates 25 and 26 and an exclusive OR-gate 27. Each AND-gate has two inputs 252, 253 and 262, 263, respectively, and an output 251 and 261, respectively. First inputs 252 and 262 are connected in parallel to the signal output 212 of the modulo N counter 21. The second input 253 of AND-gate 25 is connected to the input signal line 22 of the synchronizing detector 20, whereas the second input 263 of AND-gate 26 is connected to the output 232 of the D-flip-flop 23. The exclusive OR-gate 27 has two inputs, each connected to the output 251, 261 of a respective one of the AND-gates 25 and 26. An output 271 of the exclusive OR-gate is identical with the output of the synchronizing detector 20.

As to be seen from this relatively straight-forward logic design of the synchronizing detector, the modulo N counter 21 generates an output signal whenever it reaches the maximum count. At this time both AND-gates 25 and 26 of the comparison network are enabled to be activated by a positive signal applied to their second inputs. This means that the leading edge of the synchronizing bit which is carried along the input signal line 22 of the synchronizing detector 20 complements the state of the exclusive OR-gate 27. After this comparison the current synchronizing bit is stored in the D-flip-flop 23 since this flip-flop is enabled to store the information applied to its signal input 231 as soon as it is triggered by a signal occurring at its clock input 233. Thus, the current synchronizing bit is stored for comparison with the next synchronizing bit occurring N bits later. The state of the exclusive OR-gate 27 again is complemented since both AND-gates 25 and 26 now have identical modes of operation. In between these two subsequent changes of operation of the exclusive OR-gate 27 the synchronizing signal SYNC is generated at the output 271 of the synchronizing detector 20.

The described synchronizing detector 20 represents just one possible embodiment of such a device. The synchronizing detector 20 could be implemented in various designs meeting different requirements in accordance with the transmission format of data transferred across the external data path 10, for example. The main characteristic, however, will still be the same. The output signal of the synchronizing detector indicates the occurrence of a specific time slot within a frame of PCM data such that at the receiving end of the transmission line a frame of data transferred across the external data path 10 can be properly matched with defined starting points of frames carried along internal data paths.

Referring now again to FIG. 1, it can be seen that the output signal SYNC of the synchronizing detector 20 is supplied to the clear input 162 of the write/address generator 16 thereby controlling a setting which corresponds to the position of a synchronizing bit within a frame. The address generator 16 is increased by one each time when a clock pulse carried along the external clock signal line 18 occurs. The signal states at the outputs 163 of the write address generator 16 thus represent in common digitally encoded addresses for corresponding storage locations in both sections of the alignment buffer 14 which are selected for storing the pieces of data presently supplied to the data input 143 of the alignment buffer 14. Dependent upon the state of the most significant address bit A/B generated at the second signal output 164 of the write address generator 16 the selected buffer section 141 or 142 is determined and an entire frame is stored either in section 141 or 142 of the alignment buffer 14, alternately.

For performing read operations, there is arranged a corresponding read address generator 17 which is assembled of the same counter components. This read address generator has a clock input 171 which is supplied with an internal clock signal INT CLK defining the repetition rate of the internal pulse frame. The read address generator 17 has first outputs 173 and a second output 174 which outputs correspond to those of the write address generator 16. The states of outputs 173 and 174 define a complete read address for selecting a section and within this section a storage location of the alignment buffer 14.

The composition of the alignment buffer allows an optimum offset between storage locations for consecutive write and read operations which is identical to the length of an entire frame. Due to short term jitter and long term drift of the frame repetition rates on the external data path 10 and the internal data path 12, positive and negative deviations of this theoretical optimum offset will occur. Such deviations are not critical as long as read and write operations do not tend to over-lap in one and the same storage location.

Such critical condition can be avoided by a slip operation determined by complementing the most significant address bit of the read address. For this purpose, a further exclusive OR-gate 19 is arranged at the output side of the read address generator 17. This exclusive OR-gate has two inputs 191 and 192 and an output 193. The first input 191 is connected to the second output 174 of the read address generator 17 supplying the most significant bit of a read address. As will be described in detail in the following, the current state of this most significant address bit can be complemented by means of the exclusive OR-gate 19. When this address bit is complemented the effective read address jumps from one storage location in one section of the alignment buffer 14 to the corresponding storage location in the other section.

This simple change of reading out of an other section of the alignment buffer applies to both correcting operations with reference to a positive and a negative drift. In case of a positive drift, the repetition rate of the internal data path 12 is smaller than the current repetition rate of the external data path 10 whereby write addresses tend to catch up to read addresses. If now a slip operation has to be performed because of a tendency of over-lapping, information stored in one section of the alignment buffer is skipped, an entire pulse frame is suppressed.

In case of a negative drift, a reading out of the alignment buffer 14 is performed faster than writing and again the offset between writing address and a reading address decreases. Complementing the most significant address bit means in this case that data of a pulse frame which has been read out already once one pulse frame earlier is read out a second time.

It is known to those skilled in the art that such slip operations do not harm the proper operation of the system in general if the sampling rate for pulse encoding is sufficiently high. Nevertheless, any slip is a disturbance and it is most desirable to limit such corrections. Therefore, the alignment buffer arrangement according to the present invention having an optimum offset of an entire pulse frame does not only allow to perform a slip operation very easily without complicated control of timing such an operation but provides a buffering capacity which cuts down the recurrence of such operations drastically in comparison with conventional alignment arrangements.

Since a slip operation has to be performed prior to an overlap of reading and writing with respect to one and the same storage location, the difference between the current reading address and the current writing address is monitored for maintaining an address distance which is greater than a critical guard distance. For this purpose there is provided a guard distance monitoring device which includes an up/down counter designated as content counter 30. This content counter can be composed of conventional up/down counter components such as the synchronous 4-bit up/down counter SN54192 of Texas Instruments and similar components. The maximum count of the content counter 30 equals the overall amount of storage locations in the alignment buffer 14. The counter has a count-up input 301 and a count-down input 302; each of these inputs is connected to a control output 165, 175 of one of the address generators 16 and 17, respectively. The content counter 30 receives a write signal WR as count-up signal whenever the write address generator 16 is activated to generate a new write address. Accordingly, the count-down input 32 is supplied with a read signal RD whenever a new read address is generated. The content counter 30 has a set of data outputs 304 each associated with one of the counter stages, and a corresponding set of data inputs 303. Furthermore, it has a preset input 305 and a clear input 306. A signal applied to the clear input 306 of the content counter 30 will clear the counter. Such signal is, as indicated in FIG. 1, generated as an internal control signal during an initial starting phase. A signal applied to the preset input 305 will unlock the data inputs 303 to obtain a predetermined preset condition. This condition is determined by parallel feedback lines 307. Each feedback line connects one of the data outputs 304 to a corresponding one of the inputs 303 of the content counter directly except for the interconnection of the output and the input associated with the most significant counter stage. This feedback line includes an inverter 32. The design of the feedback network thus establishes presetting of the count of the content counter 30 to the current state except for the state of the most significant counter stage whenever the preset input 305 is activated.

A minimum distance between storage locations selected for subsequent write and read operations can now be monitored by means of a further AND-gate 34 having a plurality of inputs 341 and an output 342. Each of these inputs 341 is connected to a respective one of the outputs 304 of the content counter 30 in such a manner that some outputs associated with the least significant counter stages of the content counter 30 are not through-connected.

According to the up/down counting characteristic the content counter 30 has an overflow condition and an underflow condition. Each direction results in a critical count state which activates the AND-gate 34 to generate a corresponding output signal at its output 342. This output signal is the original control signal for starting a slip operation in the alignment buffer 14 to regain optimum offset between a write address and a read address. The output signal of the AND-gate 34 is applied, on the one hand, to the preset input 305 of the content counter 30 in order to start presetting this counter to a count which is offset from the current count by the number of addresses of an entire frame.

On the other hand, there is arranged at the output side of the AND-gate 34 a toggle flip-flop 36 having an information input 361 connected to the output 342 of the AND-gate 34. A clear input 362 of the toggle flip-flop in parallel to the clear input 306 of the content counter 30 is connected to the internal control line for receiving a control signal "INITIALIZE" in the system starting phase. The toggle flip-flop also has an information output 363 which is connected to the second input of the exclusive OR-gate 19. Whenever the state of toggle flip-flop is complemented by an output signal of the AND-gate 34, thus, a condition at the exclusive OR-gate 19 is established which causes a change of the state of this logic element thereby complementing the most significant address bit of the current read address.

It has been described hereinbefore how addresses for selecting a storage location in the alignment buffer are generated. As conventional, a multiplexor 38 is arranged between the address inputs 145 of the alignment buffer 14, on the one hand, and the respective outputs 163, 164 of the write address generator 16 and the outputs 173 and 174 of the read address generator 17, on the other hand. The plesiochronous mode of data transmission along the external and the internal data paths results in that write operations and read operations are requested independently. The multiplexor 38 has to be controlled correspondingly for avoiding colliding requests. A control signal 381 receives a write enable signal which is generated by a contention logic unit 40. This unit has a clock input 401 supplied with an internal memory clock pulse train MEM CLK, two further control signal inputs 402 and 403 and two control signal outputs 404 and 405. As indicated in FIG. 1, the control signal outputs 165 of the write address generator 16 and the corresponding signal output 175 of the read address generator 17 are connected to a respective one of these control inputs 402 and 403, as indicated by arrows marked by C and D, respectively. The contention logic, in general is designed in such a manner that is derives two buffer control signals out of any current combination of the three control signals applied to its inputs 401 through 403. The output signal generated at the first control output 404 and designated as a memory enable signal is supplied to the first control input 146 of the alignment buffer 14 for initiating a buffer operation. At the second output 405 of the contention logic unit 40 there is generated a write enable signal which is also supplied to the second control input 147 of the alignment buffer 14. The write enable signal exclusively appears whenever the buffer operation to be performed is a write operation. The designation of these two control output signals of the contention logic unit 40 does not imply that the contention logic unit is designed such that a write operation has priority over a read operation. On the contrary, the contention logic unit, as may be obtained from the following detailed description, is to be understood as a network which is associated with two devices requesting different operations independently from each other. It responds first to the device requesting such operation prior to the other one without constantly blocking the other device. Thus, in case of timely overlapping requests for a write operation and a read operation, the first requested operation is performed first and independent from further requests the second request is automatically allowed in a next step.

Figure 3:
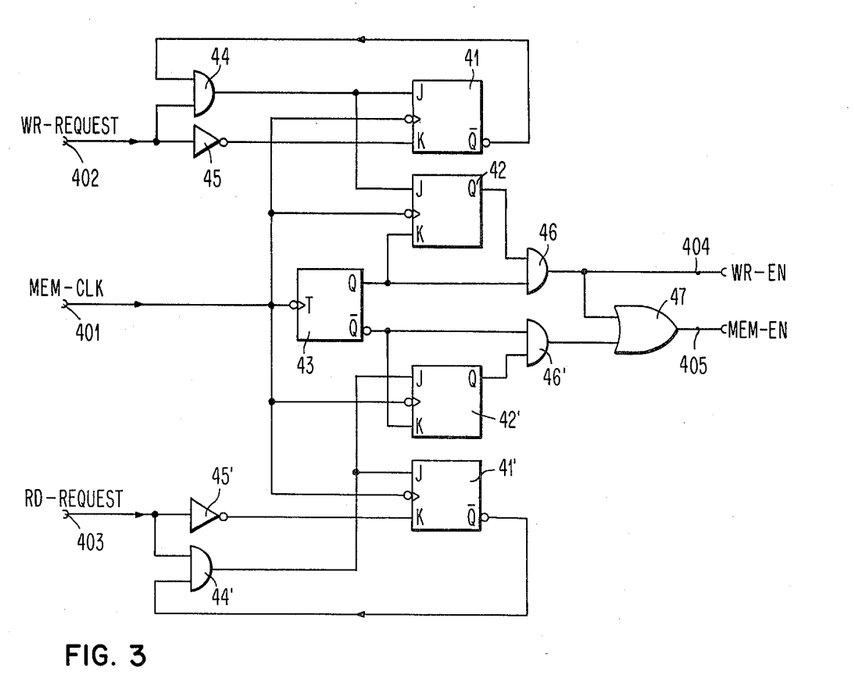
FIG. 3 shows a detailed block diagram of another one of these control devices, a contention logic network for initiating subsequent read/write operations of the alignment buffer.
Figure 4:
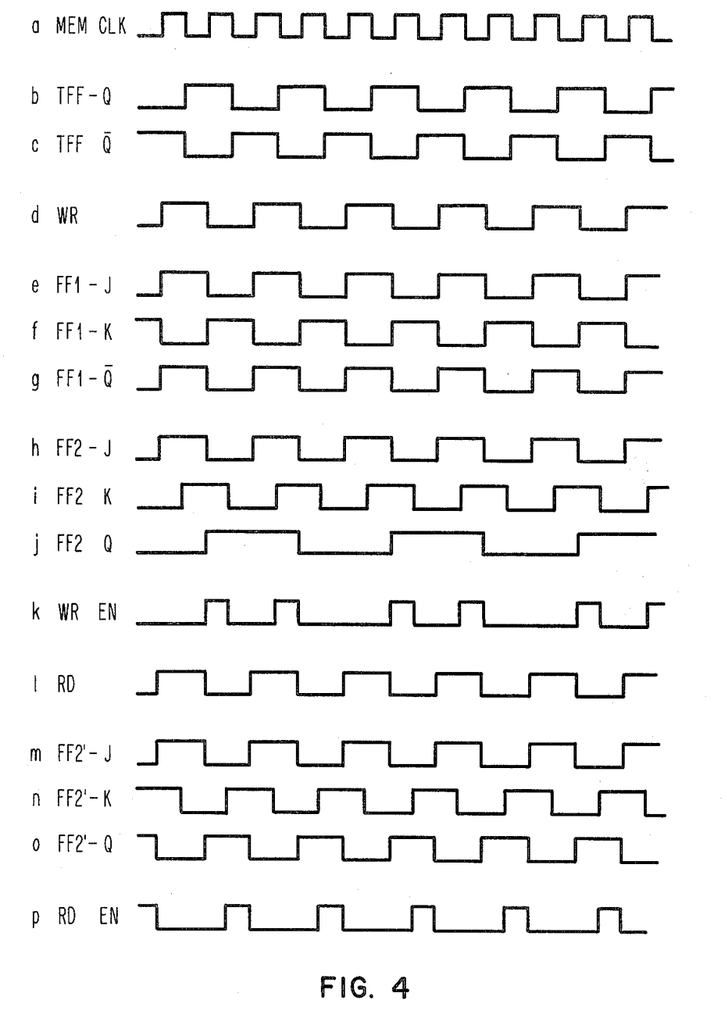
FIG. 4 represents in lines a through p wave forms of input and output signals of different elements of this contention logic network.

One embodiment of such a contention logic network is represented in a detailed block diagram in FIG. 3 which will be described in the following in conjunction with FIG. 4 showing wave forms of pulses which exemplify the operation of this network. The network is of symmetrical design including two branches each monitoring one type of the buffer operations. Both branches have in common a further toggle flip-flop 43 and include a separate pair of JK flip-flops 41, 42 and 41', 42', respectively. The contention logic network receives two further control signals, the control signal WR requesting a write operation is applied to the input 402 which is associated with one branch of the network and control signal RD requesting a read operation is received at the control input 403 which is associated with the second branch of the network.

In the first branch of the contention logic network for monitoring write operations there is arranged an input logic network including a further AND-gate 44 and a further inverter 45 which elements are arranged in parallel with respect to at least one input commonly connected to the signal input 402. The output of the inverter 45 is connected to the K input of the first JK flip-flop 41 and the output of the AND-gate 44 is connected in parallel to the J inputs of both JK flip-flops 41 and 42. Thus, the signal WR requesting a write operation is applied in its normal state to both flip-flops 41 and 42, it is however, synchronized with the current state of first JK flip-flop 41 since its $\bar{Q}$ output is connected to the second input of the AND-gate 44. The toggle flip-flop 43 has two inverse outputs Q and $\bar{Q}$ which determine in "on" condition alternately a write cycle and a read cycle, respectively. The normal output Q of the toggle flip-flop 43 is connected to the K input of the second JK flip-flop 42 and to a first input of further AND-gate 46. The second input of the AND-gate is connected to the normal output Q of the second JK flip-flop 42. Depending upon the states of the two JK flip-flops 41 and 42, this further AND-gate 46 is activated whenever during a write cycle actually a write operation of the alignment buffer 14 shall be executed. In such a condition the output of the AND-gate 46 carries the write enable signal WR-EN which is applied to the output 404 of the contention logic network.

The second branch of the contention logic network for monitoring respective read operating of the alignment buffer 14 includes a second pair of JK flip-flops 41', 42', a corresponding input network consisting of a further AND-gate 44' and a further inverter 45' and arranged between the third signal input 403 and the input side of the second pair of JK flip-flops 41', 42'. Corresponding to the output AND-gate 46 of the first branch, at the output sides of the toggle flip-flop 43 and the JK flip-flop 42' there is provided a further AND-gate 46' which is activated whenever during a read cycle actually a read operation shall be performed. An OR-gate 47 is connected by two inputs to each of the outputs of the AND-gates 46 and 46'. The OR-gate 47 has an output which is identical with the second output 405 of the contention logic network. At this output the second memory control signal MEM-EN is generated which signal determines a read or write operation to be initiated in the alignment buffer 14. Since a write operation just can be started by the write enable signal, in absence of such signal a read operation is started when the second control signal MEM-EN occurs at the output 405 of the contention logic network 40.

The design of the contention logic network is based upon the assumption that the clock frequency of the alignment buffer 40 is at least twice as high as either the external data clock or the internal data clock. The wave form of this clock signal MEM-CLK is shown in line a of FIG. 4. A second and third line b and c of FIG. 4 represent the wave forms of the inverse output signals corresponding to the alternating states of the toggle flip-flop 43 which is dynamically controlled by clock signal pulses shown in line a. This flip-flop is activated by a transition of the clock signal from high level to low level.

Line d of FIG. 4 represents a pulse train indicating subsequent signals WR requesting a write operation into the alignment buffer 14. It may be noted that the phase between the memory clock pulse train of line a and the pulse train of the line d is not predetermined and that any other phase relationship can occur as well.

Lines e, f and g of FIG. 4 show waveforms representing the input conditions and the corresponding states of the first JK flip-flop 41. This flip-flop stores requests for a write operation synchronized by the memory clock signal.

The following three lines h, i, j of FIG. 4 represent correspondingly the operation of the associated second JK flip-flop 42 except for the signal applied to the K input which is identical with one output signal of the toggle flip-flop 43. Having the conventional characteristic of a JK flip-flop in mind, and considering the triggering of the flip-flop by the memory clock signal as shown in line a of FIG. 4, the changes of the condition of the second flip-flop 42 indicated by the signal occuring at the output Q and shown in line j can be derived. As has been pointed out above, the "on" condition of the signal output Q of the second JK flip-flop 42 representing a write pulse is synchronized by the first output signal of the toggle flip-flop 43, as to be seen in line b of FIG. 4. The write enable signal WR EN shown in line k is the output signal of the synchronizing AND-gate 46 and can be derived from the pulse trains in lines b and j, respectively.

The remaining wave forms in FIG. 4 refer to the second branch of the contention logic network. Because of the symmetrical design of the network, the signal condition at the first flip-flop 41' of the second pair of JK flip-flops have not been shown explicitly. In this case the corresponding wave forms are identical to the wave forms representing the signal conditions of the first JK flip-flop 41 of the first pair of lines e through g. This is true since it is assumed that the signals RD requesting a read operation in the alignment buffer 14 occur exactly at the same time as the corresponding signals WR requesting a write operation. In general, these two pulse trains being independent from each other will show an offset. The situation shown in lines d and l of FIG. 4 however, applies to the worst case when both control signals occur exactly at the same time expressing colliding requests.

Lines m through o of FIG. 4 display wave forms representing the operation of the second JK flip-flop 42' in the second branch of the contention logic network. The read pulse train, as it is to be depicted from a comparison of line o with line j of FIG. 4, is different from the write pulse train. The deviation stems from the control operation of the toggle flip-flop 43. Subsequently, by means of the second synchronizing AND-gate 46' the read cycle pulse train synchronizes the read pulses. The resulting output signal of the AND-gate 46' is shown in line p of FIG. 4. It is easily to be obtained from a comparison of lines k and p of FIG. 4 that even requests for different operations which occur exactly at the same time will not lead to colliding operations. The contention logic network 40 controls the operation of the alignment buffer 14 such that neither such requests disturb proper operation of the buffer nor collide with each other in such a manner that one of these requests becomes lost.

There has thus been shown and described a novel alignment buffer arrangement which fulfills all the objects and advantages sought therefor. Many changes, modifications, variations and other uses and applications of the subject invention will, however, become apparent to those skilled in the art after considering the specification and the accompanying drawings, which disclose a preferred embodiment thereof. All such changes, modifications, variations and other uses and applications which do not depart from the spirit and scope of the invention are deemed to be covered by the invention which is limited only by the claims which follow.

What is claimed is:

1. A buffer arrangement of a pulse code multiplex exchange system for compensating both short and long term phase drift of information between a transmitting and a receiving data path, each data path being plesiochronously controlled by a first clock and a second clock, respectively, for transmitting of information blocks each composed of at least one pulse frame being, in turn, divided into a plurality of code words each representing a sample of a corresponding channel, said buffer arrangement comprising in combination:

(a) an alignment buffer connected between the first and the second data path and being composed of two sections, each having a capacity for storing alternately one of two subsequent information blocks in continuous storage locations;

(b) buffer addressing means associated with said alignment buffer for selecting write addresses and read addresses;

(c) address generating means connected to said buffer addressing means for generating consecutive write addresses for said alignment buffer under control of said first clock and for generating consecutive read addresses under control of said second clock;

(d) means for monitoring an offset between a current read address and the respective write address with respect to a predetermined minimal guard distance and for initiating a slip operation whenever said offset falls short of the guard distance, wherein said slip operation constitutes a read address jump from a storage location of one alignment buffer section to the corresponding storage location of the other alignment buffer section and this address jump is achieved by complementing the read address bit identifying a respective one of the alignment buffer sections; and (e) means for solving access conflicts to said alignment buffer in case of simultaneous requests for read and write operations by granting the type of information requested first without completely suppressing a subsequent request for the other type of operation.

2. The buffer arrangement as recited in claim 1, wherein said address generating means include means for generating write and read request control signals, each provided in conjunction with a respective one of the write and read addresses; and wherein said means for solving access conflicts comprise a contention logic unit having a clock input connected to receive a memory clock pulse train, a read control and write control inputs, each connected to receive a respective one of said request control signals, said contention logic unit further having a first control output for providing an enabling signal for initiating a memory operation and a second control output furnishing a signal for exclusively starting a write operation and further including a buffer logic network for buffering said read and write request control signals and for synchronizing enabling of requests with a read/write operation pattern determined by said memory clock pulse train.

3. The buffer arrangement as recited in claim 2, wherein the contention logic unit further comprises a toggle flipflop having an input connected to said clock input for receiving the memory clock pulse train and having two inverse outputs for supplying write cycle and read cycle control signals, respectively, and wherein said buffer logic network is composed of two identical network branches being symmetrically arranged with respect to said toggle flipflop, each network branch being designed for buffering a respective one of the read and write request control signals and including:

an inverter having an input and an output, and an AND-gate having first and second inputs and an output, said inverter input and said first AND-gate input being commonly connected to a respective one of said read/write control inputs; and a first and a second JK flipflop each having a clock input connected to receive the memory clock pulse train, J and K data inputs, and set and reset outputs, said J data inputs of both JK flipflops being commonly connected to said AND-gate output, the K data input of the first JK flipflop being connected to said inverter output, and the K data input of second JK flipflop being connected to a respective one of the outputs of said toggle flipflop, said reset output of the first JK flipflop being connected to the second AND-gate input and the set input of said second JK flipflop providing a write and a read pulse, respectively, to be synchronized with the respective output signal of said toggle flipflop 4. The buffer arrangement as recited in claim 3, wherein said contention logic network further comprises:

two further AND-gates each being associated with a respective one of said network branches and having first and second inputs and an output, said first inputs of said further AND-gates each being connected to a respective one of said set outputs of the second JK flipflops, and the second inputs of said further AND-gates each being connected to a respective one of the outputs of said toggle flipflop; and an OR-gate having two inputs and an output, said inputs of said OR-gate being connected to a respective one of said outputs of said further AND-gates, wherein said output of said OR-gate is connected to said first control output of said contention logic network and the output of the one of said further AND-gates associated with the network branch assigned for buffering write request control signals is connected to said second control output of the contention logic network.

* * * * *

UNITED STATES PATENT AND TRADEMARK OFFICE
CERTIFICATE OF CORRECTION

PATENT NO. : 4,429,386

DATED : January 31, 1984

INVENTOR(S) : Maynard Graden

It is certified that error appears in the above—identified patent and that said Letters Patent is hereby corrected as shown below:

In column 9, at line 67, please change "outputs" to --output--.

In column 13, at line 24, please change "information to --operation--.

In column 14, at line 26, please add -- . -- after "flipflop".

Signed and Sealed this

Eighth Day of May 1984

[SEAL]

Attest:

Attesting Officer

GERALD J. MOSSINGHOFF

Commissioner of Patents and Trademarks